June 22, 1926.

F. C. ANDERSON 1,589,342

WATER COLUMN

Filed Feb. 26, 1925

Inventor
Frank C. Anderson
By Clarence Porter
Attorney.

June 22, 1926.

F. C. ANDERSON

WATER COLUMN

Filed Feb. 26, 1925 6 Sheets-Sheet 2

Inventor
Frank C. Anderson
By Clarence Pordew
Attorney.

June 22, 1926.

F. C. ANDERSON

WATER COLUMN

Filed Feb. 26, 1925    6 Sheets-Sheet 4

Inventor
Frank C. Anderson
By Clarence Perkes
Attorney.

June 22, 1926. 1,589,342

F. C. ANDERSON

WATER COLUMN

Filed Feb. 26, 1925      6 Sheets-Sheet 6

Fig. 17.

Patented June 22, 1926.

1,589,342

UNITED STATES PATENT OFFICE.

FRANK C. ANDERSON, OF CINCINNATI, OHIO.

WATER COLUMN.

Application filed February 26, 1925. Serial No. 11,768.

My invention relates to devices for supplying water to the tanks of railway locomotives, and its object is to simplify the construction and facilitate the operation and maintenance of devices of this character. An especial object is to provide an entirely uninterrupted passage for the water upon opening the main valve. A further object is to provide for ready access to the main valve, as well as to all other valves and operating devices comprised in the water column, without the necessity of the operative working inside the column and with a minimum of disassemblage of the parts of the column; thus making the cleaning and repair of the column especially convenient. Another object is to render the mechanism as nearly as possible self-maintaining under adverse conditions due to cold weather, impure water, or water carrying considerable quantities of solid matter; and to provide for adjustment to different water pressures under which the columns must operate in different installations. Other objects will appear in the course of the ensuing description.

I attain these objects by the device illustrated, for example, in the accompanying drawings, in which—

Broadly, my column is like columns well known in the prior art, in that it comprises suitable valve means in a pit, and an upper structure comprising a spout adapted to be moved into communication with the inlet opening of a locomotive tank on a track alongside of which the column is erected; the column being constructed to swing with its spout along the track when not in use, or with its spout across the track for use. For illustration, I have included a spout and its supporting and operating details which are mainly well known in the art.

This spout 1 has the enlarged rear end, into which the T head 2 projects its forwardly and downwardly curved tapering goose-neck 3; this spout being hung, at its rear end, on a roller 4 traveling on a forwardly and downwardly curved track bar 5 while supported forwardly of its middle by cables 6 running back over a sheave 7 and sheaves 8 and from there down along opposite sides of the column to the counterweight 9. The sheaves 8 are journaled in brackets 8' fixed to the sides of the T head 2 near its top. The beam 10, having its rear end fixed in the top of the T head 2, extends forwardly over the spout 1 and supports the track bar 5 and forward sheave 7; the latter being journaled between the upright members of the guide 11 which straddles and is fixed to the upright flanges of the beam 10 and has its members diverging to form a saddle 12 below the sheave 7, up in which saddle the spout 1, when not in use, is held by the cables 6 under action of the counterweight 9.

Above the beam 10 the guide 11 has the forward part of the valve-operating lever 13 between and guided by its members. This lever extends through and is fulcrumed at 14 in the top housing 15 fixed on top of the T head 2. A chain 16, with a ring 17 depends from the front end of the lever 13; and a stirrup bar 18 straddles and is fixed to the front end of the beam 10, inclining down and forward over the front end of the spout 1. This stirrup bar 18 may be engaged for swinging the column, or the ring 17 may be engaged for pulling the lever 13 down to open the valve, by a hook in the hand of the operator standing on the locomotive tank, who depresses the spout, against the pull of the counterweight, and holds the spout down to the tank inlet by bearing his weight thereon. He has control of the spout in lowering and raising it, by means of the handle 19 fixed on the top of the spout near its front end.

The foregoing details are similar to those well known in the art. However, I have improved some of them in accordance with my object of simplifying and strengthening the construction of the column throughout. Thus, in reinforcing the beam 10, the stays 20, connected at their rear ends to the upper extremity of the top housing 15, as in the prior art, are simplified in their attachment to the beam 10 by using the upward projection 21 of the front part of the track bar 5, where it extends through the horizontal web of the beam 10, to connect both stays 20, one above the other, by the same nuts that secure the track bar 5 to the beam.

Another improvement, in conformity with my improvements in construction of the lower parts of the column, to be described, for avoiding any reduction from the nominal conducting area of the column, consists in making the open rear end of the spout 1 relatively much greater in its vertical than in its horizontal diameter, with a corresponding cross-section of the goose-neck 3 at its junction with the upright part of the T head 2, and so maintaining the enlarged cross-section of this goose-neck 3 in its required tapering forward extent that the forward outlet end of the goose-neck is of the full area of the interior upright conduit part of the column, of which the T head 2 is the uppermost member.

Where the spout 1 is connected to its roller 4, provision is made for up and down adjustment of the spout relatively to the goose-neck 3 by having the connection made up of a U-bar 22 straddling the roller 4 and an eye bolt 23 pivoted to the spout 1 and held up through the bottom of the U-bar by a nut 24. With such adjustment possible, the spout 1 may be made to fit the goose-neck 3 rather closely, yet avoid binding in its up and down and backward and rearward travel thereover.

As the remainder of the details of the upper part of the column are involved with my novel construction and arrangement of the valve mechanism and of the swiveling mechanism by which the column is swung across the track for use or parallel with the track when out of use, it is convenient now to describe the construction of the lower part of the column. The valve chamber 25 is mainly circular, with four radially extended feet 26 which, as is well known in the art, are supported upon suitable concrete, wooden or other foundation members, not shown. At its rear end the chamber 25 has the inlet neck 27 with an annular flange 28 by which it is bolted to the supply main, understood to run from the water tank, water works, or other source of water supply. At its front end, preferably cast integral with the chamber 25, are the dash pot 29 and the settling chamber 30; an upright passage 31, however, being left between these and the main body of the chamber, and the open tops of the dash pot and settling chamber being considerably below the top of the main part of the valve chamber. The bottom of the valve chamber 25 is made up of a central higher part and a surrounding generally lower part, lateral portions 32 and a front portion 33 of which are arched upward to leave downwardly opening recesses in the exterior of the bottom; the front recess coinciding with the upright opening 31.

Centrally of the higher central part of the chamber bottom is a boss down through which is an opening with a bushing 34 which has an outwardly extended annular flange down against the top of the boss and forms a guide bearing for the upright main valve rod 35 embraced by a packing ring 36 held down on the bushing flange by a clamp ring 37 screwed to the boss through the packing ring and flange. The upper end part of this rod 35, within the chamber, is reduced and fits in the hub of the main valve 38, which is an upright cylindrical shell with arms 39 extending from the hub to the interior of the shell; there being, as here shown, three of these arms. The lower rim 40 of this shell, which preferably is somewhat thickened as shown, to afford increased bearing surface, rests, when the valve is closed, on the valve seat 41 of suitable gasket material, such as rubber. This seat 41 is annular, with inwardly and outwardly projected annular flanges adjacent its bottom; the outer flange being held under an inwardly extended annular flange on the upright annular rim which is formed on the raised central part of the chamber bottom, and the inner flange of this seat being held in similar manner under an outwardly extended annular flange on the clamp ring 42 screwed to the raised central part around the central boss thereof. The main valve 38 is held down on the rod 35 by a nut 43 screwed on the upper end of the rod.

The top of the valve chamber 25 has an opening considerably greater in diameter than the main valve 38, and the lower casing 44, of internal diameter intermediate of those of the top chamber opening and the main valve, has an outwardly projected annular flange by which it is screwed down on the top of the chamber concentric with the valve 38. The lower end of this lower casing 44 is counterbored, receiving the main-valve bushing 45 with its lower edge flush with the bottom of the casing 44, up against which bottom is secured the main valve packing ring 46, embracing the main valve, along with the scraper ring 47, which latter has a series of openings 48 that admit water to press on the packing ring 46 and maintain its tightness against the main valve. This scraper ring 47 has its lower edge sharp, close against the exterior of the main valve.

Figures 8, 9, 10, 11, 12, 13:
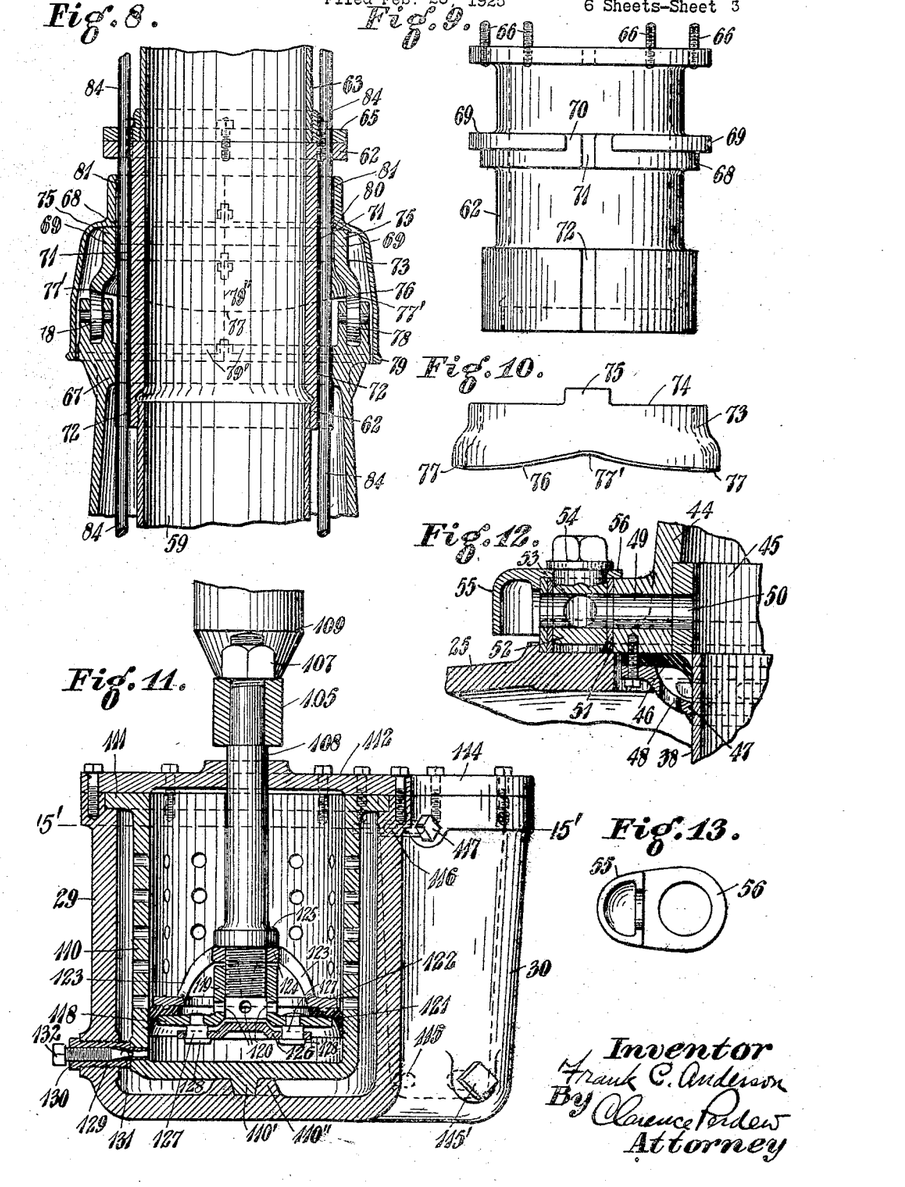
Fig. 8 is a partial vertical section on the plane of the line 8—8 of Fig. 2, further illustrating the construction included in the lower section of Fig. 5.
Fig. 9 is a detail side elevation of the hub.
Fig. 10 is a similar view of the cam.
Fig. 11 is a vertical cross-section of the dash pot, enlarged, on the plane of the line 11—11 of Fig. 14.
Fig. 12 is a partial vertical section, on the same enlarged scale, on the plane of the line 12—12 of Fig. 14, showing the construction of one of the drains.
Fig. 13 is a detail bottom plan view, on the same enlarged scale, of one of the drain spouts.

Exteriorly, the lower casing has radial bosses projected up from its bottom flange, two of these being provided at each side of the chamber, as here shown, and through each of these bosses is a radial drain passage 49; the main-valve bushing 45 having openings 50 registering with respective drain passages 49. Each of these bosses, near its outer end, has the upright plug opening down across the drain passage 49, with a bushing 51 having side openings registering with the passage 49. The valve plug 52 fits in this bushing 51, with a transverse opening 53 registering with the passage 49 when the plug is turned in one position; the plug closing the passage 49 when turned ninety degrees from that position. The upper end part of the plug 52 has the annular flange 54, above which it is made square to receive a wrench. To divert the drainage down onto the top of the chamber and prevent it from washing out the sides of the pit in which the valve chamber is installed, each drain has a drain spout 55 (Figs. 12 and 13) to fit across the outer end of the drain passage 49 with a top horizontally extended ear 56 embracing the valve plug 52; the flange 54 of the plug holding the spout down by engagement down against this ear 56. The plug 52 remains in place, as here shown, by friction in the bushing 51, in which it is fitted rather tightly; and by the same means holds the drain spout 55 in place.

The lower casing 44 has a top flange, and the upper casing 57 is similar to the lower casing, having a bottom flange bolted to the top flange of the lower casing, and top flange supporting a packing ring 58 which embraces the lower pipe section 59 and is held down by a clamp ring 60 bolted through the packing ring to the upper casing top flange. About midway of its height, interiorly, this upper casing 57 has an annular bearing 61 snugly embracing and guiding the pipe section 59, which ends somewhat above the bottom of the upper casing.

This lower pipe section 59 extends up out of the pit through the floor structure A (Fig. 1) which is understood to cover the pit, as is well known in the art, and the upper end of this lower pipe section 59 is screwed into the lower end of the hub 62. The upper pipe section 63, only very short parts of which are shown, but which actually, in practice, is the longest part of the column, has its upper and lower ends screwed into flanges 64 and 65, respectively; the lower flange being secured to the top of the hub 62 by studs and nuts 66, and the upper flange being bolted to the flange on the lower end of the T head 2, previously described. The lower end part of the hub 62 is enlarged considerably, and fits slidingly in the upper end of the pedestal 67, which, as here shown, is made in two sections, one below and the other above, merely to avoid excessive weight in any one part. This pedestal 67 surrounds the lower pipe section 59 and is secured down on the floor structure A; and its top thus forms the upper guide, while the bearing 61 of the casing 57 forms the lower guide, for the structure made up of the lower pipe section 59, hub 62, upper pipe section 63, and the T head 2 and parts supported thereon as before described. In these guides this structure may turn on an upright axis, and may slide up and down lengthwise of that axis.

About midway of its height, the hub 62 (Fig. 9) has the enlargement 68, out from the upper part of which project the segmental flanges 69 leaving, between their adjacent ends at each side of the hub, recesses 70, in the middle of each recess being an upright notch 71 through the enlargement 68. In alinement with each notch 71 the lower enlarged part of the hub has an upright groove 72. The cam 73 is a ring with its upper rim 74 fitting snugly around the enlargement 68 of the hub 62 up against the flanges 69 thereof and having lugs 75 fitting snugly up in the recesses 70. The lower rim 76 of this cam 73 is larger in diameter than the upper rim 74 and constitutes a downwardly facing cam surface farthest downwardly projected at opposite sides 77 ninety degrees from the upper rim lugs 75 and receding upward around to farthest upwardly receded seat portions 77' coincident with the respective lugs 75. This relative arrangement of the upper and lower rim formations of the cam 73 is preferred, as it permits the lugs 75 to reinforce the cam opposite its most receded parts.

The pedestal 67 carries rollers 78 on its top, journaled in ears formed on the pedestal top at opposite sides, on which rollers the lower rim 76 of the cam 73 rests; the parts being so positioned relatively to each other that the upper structure of the column rises as it is swung across the track and returns to a position with the spout along the track under action of gravity until the farthest recessed seat parts 77' of the cam reach the respective rollers 78. As shown herein, this arrangement results from mounting the pedestal 67 with its rollers 78 axially alined at right angles to the track. To cover the cam 73 and rollers 78, the hood 79 is provided, comprising a lower main part surrounding the cam and rollers with its bottom rim even with the bottom of the top flange of the pedestal 67 when the structure is in lowered position as illustrated; and having a top neck portion fitting in around the hub 62 above the enlargement 68 thereof, with an annular shoulder 80 by which it is supported on the flanges 69 of this enlargement. This neck portion has inwardly opening channels 81 in upright alinement with the notches 71 and grooves 72 of the hub 62; and is made high enough just to clear the under side of the top flange of the hub 62 when it is carried up with the hub, so that there is a minimum opening above the neck under the flanges, better to exclude moisture from the covered mechanism. It is to contribute to this condition that studs and nuts 66 are used in the upper hub connection, rather than bolts, so as to leave the bottom of the top hub flange clear. So that this hood 79 may be removed readily for access to the covered mechanism, it preferably is made in two semicircular sections 79', bolted together along upright joints 79'' at right angles to the channels 81 of its neck. It will be understood that the cam 73 may be similarly made up if desirable to have it readily removable, or if breakage requires replacement of the cam; thus avoiding disassemblage of the upper structure of the column; the joints, in such case, preferably being located ninety degrees from the top lugs 75 of the cam.

Figures 5, 6, 7:
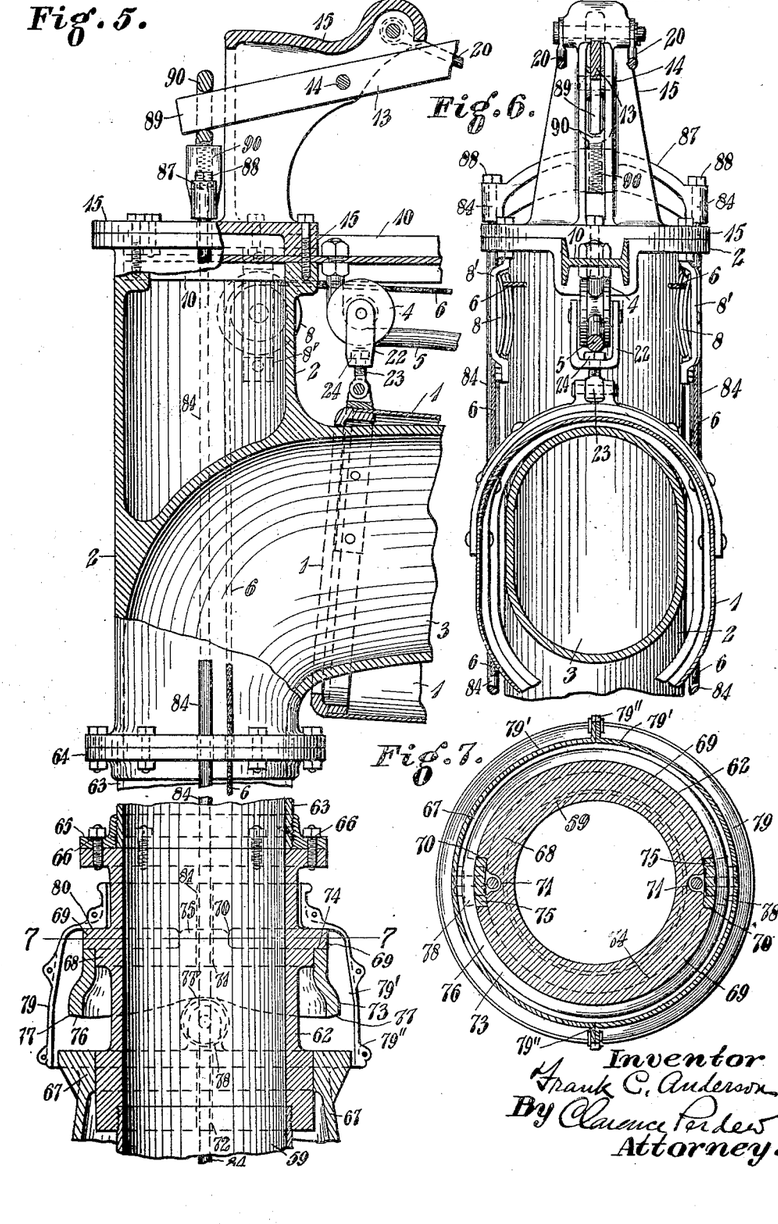
Fig. 5 is an enlarged vertical-sectional side elevation of the upper rear part of the column, the section being on the plane of the line 5—5 of Fig. 2.
Fig. 6 is a sectional front elevation of the top rear part of the column, the section corresponding to the broken-away forward parts in the upper section of Fig. 5.
Fig. 7 is a horizontal cross-section on the plane of the line 7—7 of Fig. 5.

Around the lower pipe section 59, between the pedestal 67 and the casing 56, the upper valve-operating ring 82 is fixed by means of short links 83 on the lower ends of the upper valve-operating rods 84, which extend up along opposite sides of the pipe section 59, through the guides 85 secured to the pipe section by the screws 86 passed out through the pipe wall. These rods 84 extend up through the pedestal 67, through the grooves 72 and notches 71 of the hub 62 (Figs. 7 and 8) and through the channels 81 of the hood 79, through openings in the top flange of the hub 62, and through openings in the flanges 65 and 64 of the upper pipe section 63, and through openings in the bottom and top flanges of the T head 2 and in the bottom plate of the top housing 15, above which plate these rods extend up through respective end parts of the upper valve-operating yoke 87, with heads 88 thereabove. This yoke 87 extends across behind the upright part of the housing 15 below the rear short arm 89 of the valve-operating lever 13, to which it is connected by an eye-bolt 90 having its shank screwed down into the middle of the yoke 87.

The rods 87 have a swivel connection with the main valve 38, by means of the lower valve-operating ring 91 and the lower valve-operating yoke 92; and this entire connection, including the long rods 87, forms part of the weight to seat the valve. In swinging the column around, raising it by its cam 73, this connection remains down, resulting in swinging the valve lever 13 upward at its front end; then, pulling down this end of the lever opens the valve. The eye bolt 90 permits the effective length of this connection to be adjusted, to vary the maximum valve opening as desired.

Figure 14:
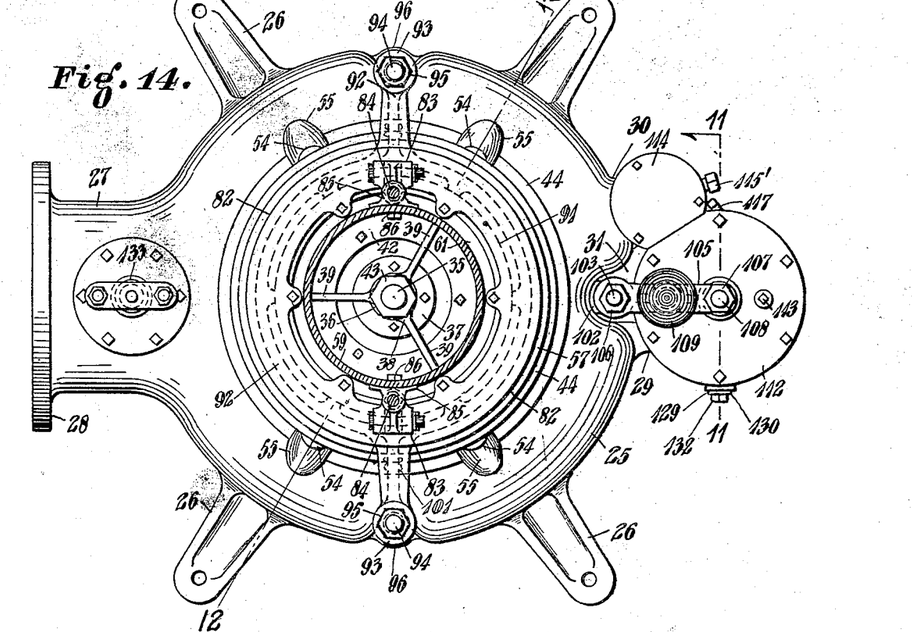
Fig. 14 is a horizontal cross-sectional plan view of the lower part of the column, the section being on the plane of the line 14—14 of Fig. 17.

The lower valve-operating ring 91 is of L-shaped cross-section with its horizontal leg at its bottom, outwardly projected, and surrounds the lower pipe section 59 and is bolted up to the upper ring 82 through radially inwardly projected ears on the two rings 91 and 92 (Fig. 14). The lower valve-operating yoke 92 has its main part annular, around the upright part of the lower ring 91, and fits rather closely between the bottom flange and the upper ring 82, and arms 93 extending radially at opposite sides of the column. The lower valve-operating rods 94 have their upper ends reduced and projected up through the outer end parts of the respective yoke arms 93, and secured therein by nuts 95 on the upper ends of the rods. These rods extend down through bushings in bearing lugs 96 formed on the valve chamber sides and down through upright recess in these sides below these lugs, and have their lower ends reduced and fitted in the outer end parts of the main-valve-operating beam 97, and secured therein by nuts 98 on the lower ends of the rods. This beam 97 extends across under the lateral arched portions 32 of the valve chamber bottom, into which it rises when pulled up by the rods 94; and the main valve rod 35 has its lower end part reduced and fitted in the middle of this beam 97, being secured therein by a nut 99 on the lower end of the rod 35. The lower yoke 92, swiveling on the rings 82 and 91, permits the upper rods 84 to travel with the turning upper structure while the lower rods 94 remain stationary with the valve chamber; yet as this yoke is held between the rings 82 and 91, the main valve 38 and its operating lever 13 are held closely together with respect to up and down movement.

Figures 1, 2, 3, 4:
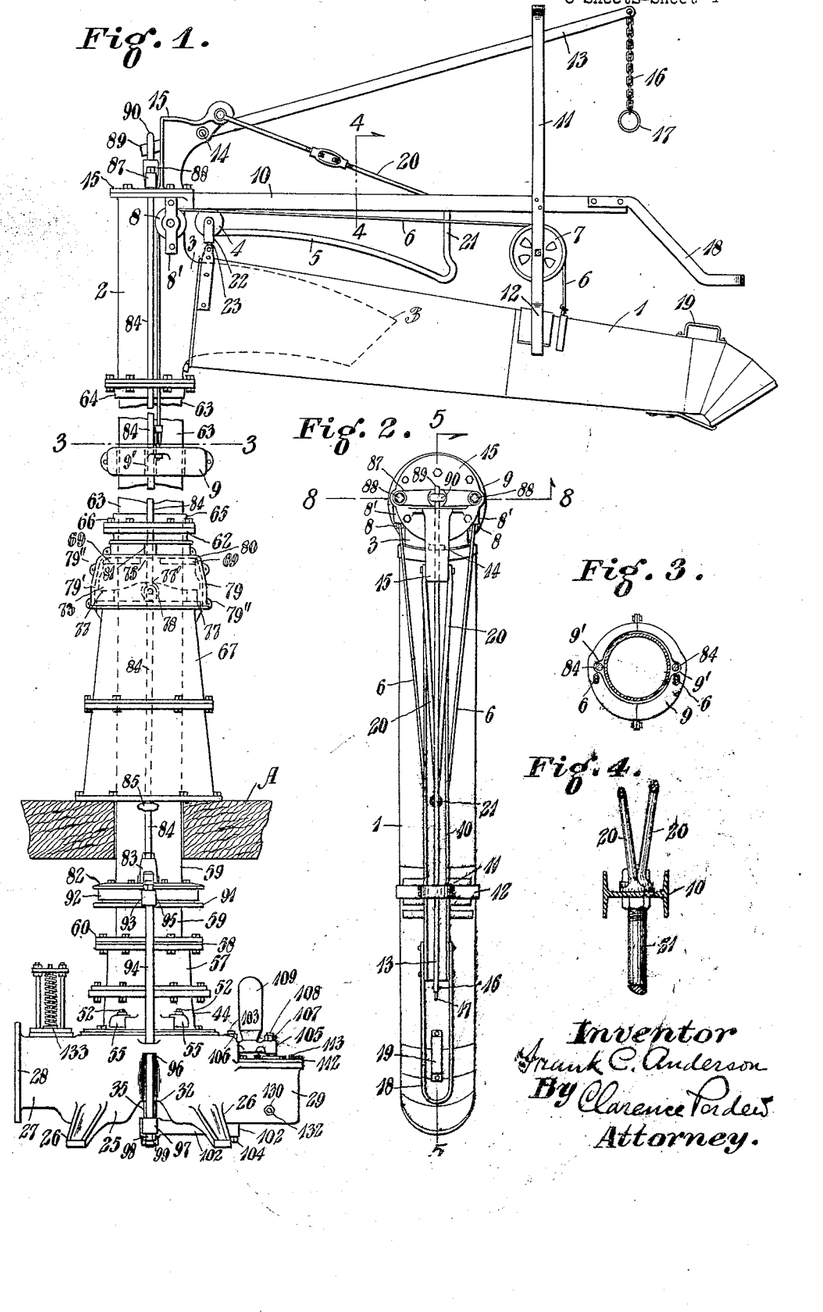
Figure 1 is a side elevation, intermediate parts of the column being represented as broken away and omitted, for lack of space.
Fig. 2 is a partial plan view of the same.
Fig. 3 is a horizontal cross-section on the plane of the line 3—3 of Fig. 1, of an intermediate part of the column, showing the counter-weight for the spout, in its relation to the adjoining other mechanism of the column.
Fig. 4 is a detail cross-section on the plane of the line 4—4 of Fig. 1, enlarged, showing the connection of the spout-support stay rods and spout track.

The counterweight 9, before mentioned, is annular, in two sections bolted together around the upper pipe section 63 to slide up and down thereon; and has inner notches 9' through which the upper valve-operating rods 84 extends (Fig. 3). Its cables 6 are connected to it forwardly of these notches and rods; extending up along the fronts of the rods 84. So that this weight 9 may hang properly on these forwardly displaced cables, I make its periphery eccentric to its interior opening, so that it is thicker at its front.

By unbolting the upper casing 57 from the lower casing 44, the upper casing may be slid up along the lower pipe section 59, allowing the lower casing 44 to be unbolted and removed sidewise; thus leaving a space from the lower end of the pipe section 59 down to the top of the valve chamber 25 for access to the interior of the valve chamber. The lower casing 44 carries with it the main-valve bushing 45, packing ring 46 and scraper ring 47, when removed, permitting full access to these parts; and through the ample space thus left above the valve chamber, the workman readily may reach any part of the interior of the valve chamber 25 after removal of the main valve 38 through this space. Thus inspection, repair or replacement of the valve seat 41 and the packing around the valve rod 35 is very convenient. To hold the upper casing 57 up for such access, hooks 100 depend from the respective lower yoke arms 93, to engage trunnions 101 radially extended from the clamp ring 60 on top of the upper casing 57.

The main-valve-operating beam 97 has a middle arm 102 projecting forward under the forward arched portion 33 of the valve chamber bottom, into which it rises as the main valve 38 is opened; and this arm 102 has fixed in its front end part the reduced lower end part of the plunger-connecting rod 103, held therein by a nut 104 on the lower end of the rod. This rod 103 extends up through the passage 31 between the main part of the valve chamber and the dash pot 29 and settling chamber 30, and has its upper end reduced and fixed in the rear end part of the plunger-connecting yoke 105 by a nut 106 on the upper end of the rod. This yoke 105 connects by a nut 107 with the reduced upper end part of the dash-pot plunger rod 108; and a weight 109 removably mounted in the middle of this yoke 105 tends to equalize the action of this connection in transmitting the motion of the main-valve-operating mechanism to the dash pot plunger.

The dash pot 29 has the inner perforated casing 110 with a bottom lug 110' fitting in an annular boss 110'' on the bottom of the dash pot, and with an outwardly projected annular flange 111 at its top, fitting down in a depression formed around in the rim of the dash pot, which has a cover 112 bolted down on it, holding the inner casing 110 down, and having the plunger rod 108 sliding up and down through its central part. This cover has, at one side, an opening closed by a screw 113, permitting insertion of oil or the like, as is required where the water contains so much sediment that it will clog the dash pot notwithstanding its first having passed through the settling chamber.

Figure 15:
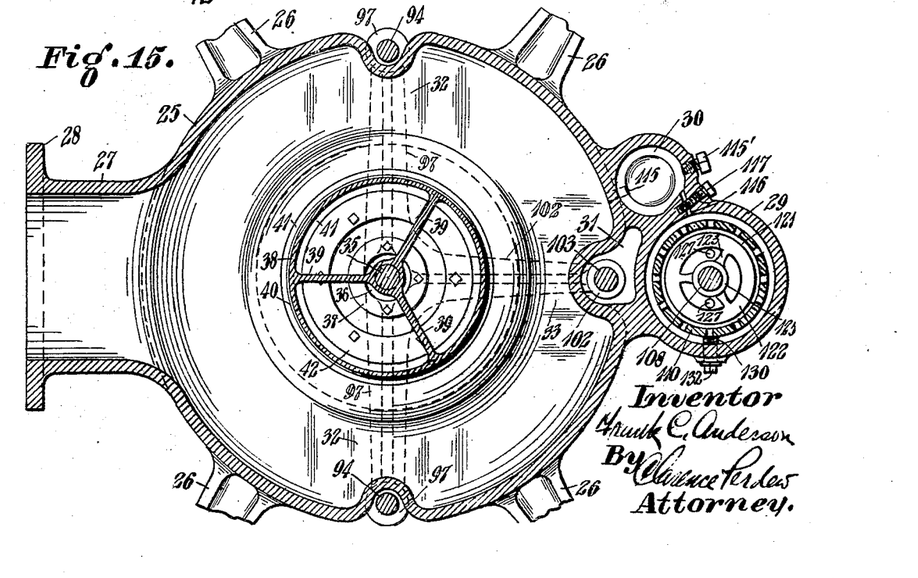
Fig. 15 is a horizontal cross-section on the plane of the line 15—15 of Fig. 17, but part of the dash pot and settling chamber wall being in section on the plane of the line 15′—15′ of Fig. 11, to show the passage therethrough.
Figure 16:
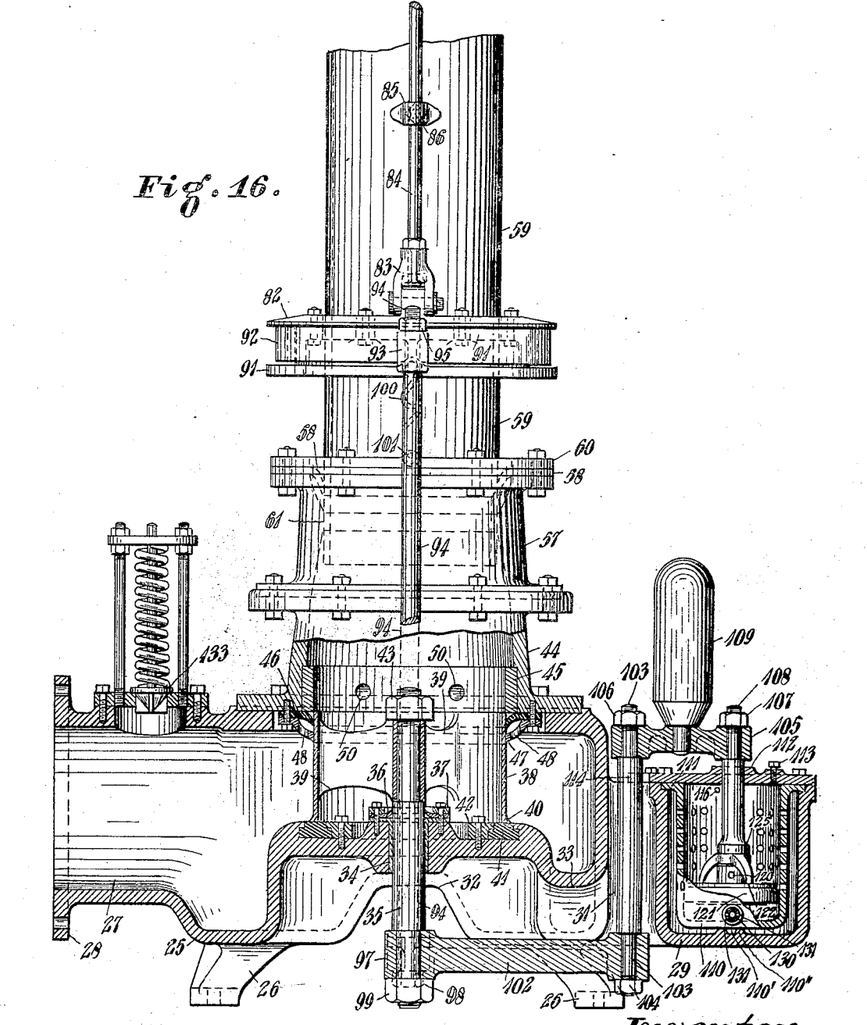
Fig. 16 is a vertical-sectional side elevation of the lower parts of the column, the section being on the plane of the line 5—5 of Fig. 2, which, however omits the details shown in Fig. 16.
Figure 17:
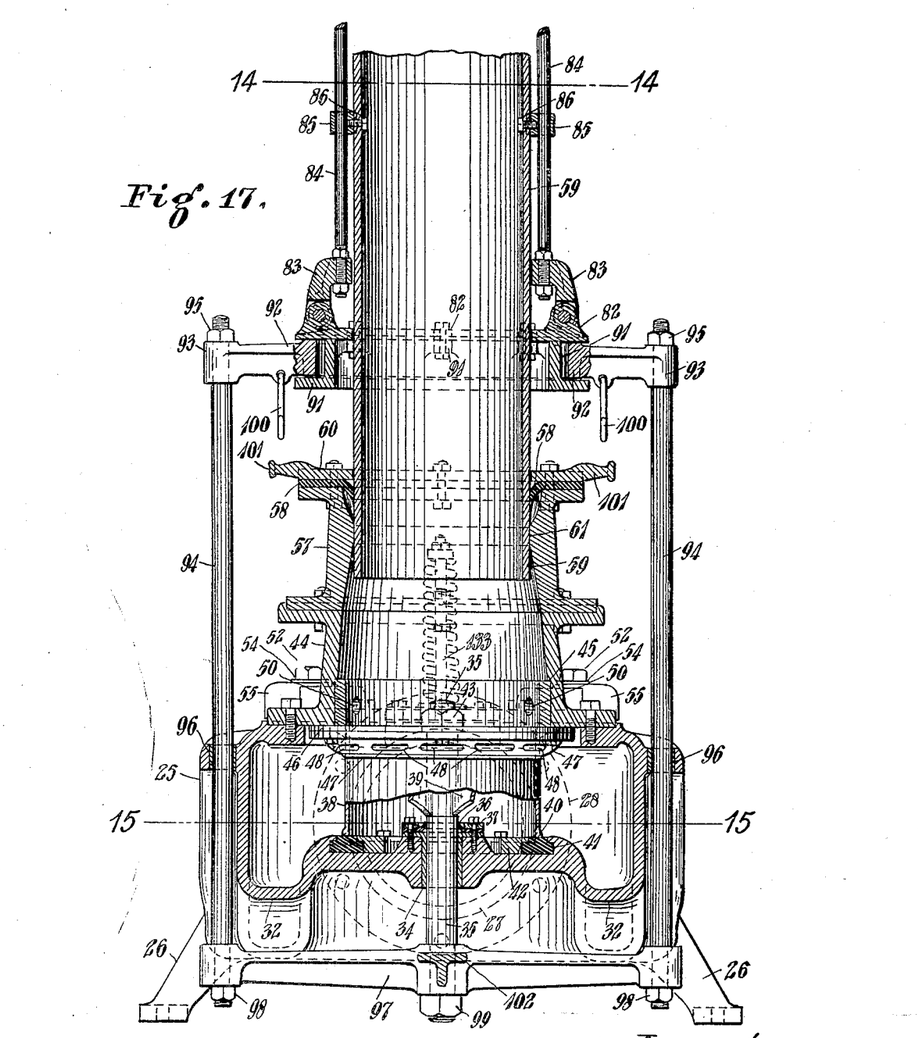
Fig. 17 is a vertical section on a plane at right angles to that of Fig. 16, corresponding to the plane of the line 8—8 of Fig. 2.

The settling chamber 30 is of the same depth as the dash pot, but smaller in diameter, and has its top closed by the cover 114. At its bottom (Figs. 11 and 15) it has the port 115 into the interior of the main valve chamber 25. The opening closed by the screw 115' in the outer wall of the settling chamber admits the drill for forming the port 115, also serving as a drain outlet from the valve chamber 25 when making repairs therein. At its top, the settling chamber 30 has the port 116 into the dash pot 29, closed, as illustrated, by a screw 117 passing in from the side of the settling chamber, if oil is being used in the dash pot; but otherwise this screw 117 is screwed outward, leaving the port 116 open, admitting water to the dash pot 29, which water first passes up through the settling chamber from the port 115 as supplied from the main valve chamber 25, thus being freed of sediment which would clog the passages in the dash pot mechanism.

The dash pot plunger comprises the disk-shaped body 118 with a central upright hollow hub 119 having its upper end screwed onto the lower end of the plunger rod 108; below which this hub has the lateral ports 120. The packing ring or cup 121 is carried on top of this body 118, and the clamp yoke 122 is a ring bearing on top of the packing ring 121, with arms 123, as here shown three in number, extending inward and upward to a ring-shaped hub 124 embracing the plunger rod 108 up against an annular flange 125 on the rod; the packing 121 thus being clamped between the body 118 and yoke 122 by screwing the body upward on the rod 108, and being cupped down over the periphery of the body 118 to bear out against the inner wall of the perforated inner casing 110. The body hub 119 opens downwardly, with a beveled valve seat around its opening, for the check-valve 126, which is a disk with raised correspondingly beveled central part, sliding up or down on studs 127 projecting down from the body 118, with heads 128 on their bottoms on which the valve 126 rests when open, as the plunger rises. As the plunger descends this valve 126 is raised and closed by pressure of the trapped liquid.

The governor 129 comprises the bushing 130 screwed through the dash pot wall near its bottom, with a nipple entering an opening at the bottom of the inner casing 110, adjacent to which nipple the bushing is interiorly tapered, with lateral ports 131 leading out into the annular space around the casing 110. The governor valve plug is a screw 132 threaded into the bushing 130 from its outer end, with a tapered inner end fitting the taper of the bushing interior, to close the ports 131 to a greater or less degree; thus varying the outlet capacity of the perforated casing 110 and adjusting the resistance to descent of the plunger and its cushioning effect on the closure of the main valve 38 connected rigidly to the plunger by the yoke 105, rod 103 and beam 97 as before described. By removing the governor 129, the liquid may be drained from the dash pot; as in changing from water to oil, or vice versa.

Upon the inlet neck 27 of the main valve chamber 25 is the relief valve 133, operating, as is well known in the art, to release part of the water immediately after closing of the main valve 38, eliminating the shock on the mains that would result from too sudden stoppage of the flow.

It will be seen that I have confined all of the packed movable joints within the pit, below the freezing line; and have eliminated all of the operating mechanism from the interior of the conduit formed by the lower pipe section 59, hub 62, upper pipe section 63 and T head 2. Inclusion of valve operating mechanism in this part of the column has, in prior devices, been the cause of serious obstruction to the flow from the main valve to the spout; not only reducing the area from that nominally attributed to the column, but, by causing eddy currents, reducing the actual flow even beyond that which theoretically would be expected in such reduced area. The main valve 38 and its immediately associated parts, which are out of the path of flow when the valve is open, are the only mechanism retained by me within the water conducting enclosure; and I make these readily accessible in a very simple manner, as has been described.

A further advantage is the ready adjustment of the drain devices. No parts need be removed or replaced. Merely turning the plugs 52 with a wrench adjusts for drainage when cold weather requires that, or readjusts for retaining the water up in the column when permitted by warmer weather. With difficultly operated drain devices, the operatives tend to neglect adjustment in accordance with weather changes; so that a column may become frozen up from lack of drainage, or may be left to drain when warm weather permits retention, so that unnecessary delay in flow, while the column fills above the main valve, is occasioned. My improvement reduces such neglect.

The scraper ring 47 acts to keep the main valve 38 free of corrosion, which would diminish the effectiveness of the packing or gasket 46; yet this scraper is compact and does not obstruct the flow nor hinder the seating pressure on the gasket 46. In addition, it supports the gasket 46, and tends to guide the upper end of the main valve 38.

It will be recognized that various modifications may occur, either in details of the prior art associated with my improvements, or in the improvements themselves; and I do not wish to be understood as being limited to the precise disclosure herein, but having thus fully described a preferred embodiment of my invention, as is required,

What I claim as new and desire to secure by Letters Patent is:

1. In a water column, a valve chamber having an inlet in one side and an outlet in its top and an annular valve seat on its bottom, a spout above said chamber, a conduit leading from said outlet to said spout, a valve comprising a hollow shell sliding up and down in said outlet and seating its lower edge on said seat when down, operating means for said valve, mounted on said column adjacent to said spout, and an operative connection extending down from said operating means outside said conduit and connected to said valve up through the bottom of said chamber, centrally of said seat, said connection being adapted to impose its weight on said valve, to seat said valve, and, by virtue of its upwardly extended connection to the valve, minimizing the tendency to tilt said valve on its seat.

2. In a water column, a valve chamber having an annular valve seat on its bottom, interiorly thereof, a valve comprising a hollow shell seating downwardly on said seat, a spout above said chamber, a conduit from said chamber to said spout, comprising a part fixed to said chamber and a part turning with said spout on an upright axis, operating means for said valve, mounted on said upper part adjacent to said spout, and a swiveling operative connection extending down from said operating means outside said conduit and connected to said valve up through the bottom of said chamber, centrally of said seat, said swiveling connection being adapted to impose its weight on said valve, to seat said valve, and by virtue of its upwardly extended connection to the valve, minimizing the tendency to tilt said valve on its seat.

3. In a water column, a valve chamber having an annular valve seat on its bottom, interiorly thereof, a valve comprising a hollow shell seating downwardly on said seat, a spout above said chamber, a conduit from said chamber to said spout, means comprising a plunger outside said chamber, for retarding the seating of said valve, operating means for said valve, mounted on said column adjacent to said spout, and an operative connection extending down from said operating means outside said conduit, connected to said plunger, and connected to said valve up through the bottom of said chamber, centrally of said seat.

4. In a water column, a valve chamber, a valve seating downwardly in said chamber, a spout communicating downwardly with said chamber, a connection extending from said valve through the bottom of said chamber, a beam extending from said connection under said bottom to opposite sides of said chamber, rods extending from said beam up along said sides of said chamber, and operating means for said valve, mounted on said column adjacent to said spout and connected to said rods.

5. In a water column, a valve chamber, a valve seating downwardly in said chamber, a spout communicating downwardly with said chamber, a connection extending from said valve through the bottom of said chamber, a beam extending from said connection under said bottom to opposite sides of said chamber, rods extending from said beam up along said sides of said chamber, operating means for said valve, mounted on said column adjacent to said spout and connected to said rods, means comprising a plunger for retarding closure of said valve, outside said chamber, and an extension on said beam, connected to said plunger.

6. In a water column, a valve chamber having a bottom with a raised central part and upwardly arched parts at opposite sides of said central part, a valve in said chamber above said central part, a spout communicating downwardly with said chamber, a connection extending from said valve down through said central part of said bottom, a beam extending from said connection under said arched parts of said bottom to opposite sides of said chamber, rods extending from said beam up along said sides of said chamber, and operating means for said valve, mounted on said column adjacent to said spout and connected to said rods.

7. In a water column, a valve chamber having a bottom with a raised central part and upwardly arched parts at opposite sides of said central part and a third arched part at another side of said central part, a valve in said chamber above said central part, a spout communicating downwardly with said chamber, a connection extending from said valve down through said central part of said bottom, a beam extending from said connection under said opposite arched parts of said bottom to opposite sides of said chamber, rods extending from said beam up along said sides of said chamber, means comprising a plunger for retarding closure of said valve, outside said chamber near said third arched part of said bottom, and an extension on said beam, under said third arched part, connected to said plunger.

8. In a water column, a valve chamber, a valve in said chamber, a spout above said chamber, a conduit from said chamber up to said spout comprising an upper casing movable upwardly away from said chamber and a lower casing connecting said chamber with said upper casing and removable sidewise when the upper casing has been moved upwardly, and operating means for said valve, mounted on said column adjacent to said spout, connected through the bottom of said casing to said valve.

9. In a water column, a valve chamber, a valve seating downwardly in said chamber, a spout above said chamber, a conduit from said chamber up to said spout comprising a casing fixed on the top of said chamber and an upper structure turning on an upright axis relatively to said casing and chamber, operating means for said valve, mounted on said column adjacent to said spout, upper rods extending from said operating means down along opposite sides of said conduit, lower rods connected to said valve through the bottom of said chamber to move up and down directly with said valve and extending up along opposite sides of said conduit and a swivel connection from said upper rods to said lower rods, surrounding said conduit.

10. In a water column, a valve chamber, a valve seating downwardly in said chamber, a spout above said chamber, a conduit from said chamber up to said spout comprising a lower casing fixed on the top of said chamber, an upper casing fixed on the top of said lower casing, and an upper structure turning on an upright axis relatively to said casings and chamber, operating means for said valve, mounted on said column adjacent to said spout, a swiveling operative connection from said operating means to move up and down directly with said valve, extending through the bottom of said chamber, said upper casing being movable upwardly away from said chamber and said lower casing being removable sidewise when the upper casing has been moved upwardly, and means for suspending said upper casing on said swiveling operative connection.

11. In a water column, a valve chamber, an upright hollow cylindrical valve in said chamber, a spout above said chamber, a conduit from said chamber up to said spout comprising an upper casing movable upwardly away from said chamber and a lower casing connecting said chamber with said upper casing and removable sidewise when the upper casing has been moved upwardly, annular packing means embracing said valve and supported on the bottom of said lower casing for removal therewith, and operating means for said valve, mounted on said column adjacent to said spout, connected through the bottom of said chamber to said valve.

12. In a water column, a valve chamber, an upright hollow cylindrical valve in said chamber, a spout above said chamber, a conduit from said chamber up to said spout comprising an upper casing movable upwardly away from said chamber and a lower casing connecting said chamber with said upper casing and removable sidewise when the upper casing has been moved upwardly, annular packing means embracing said valve, and annular scraping means embracing said valve, said packing means and said scraping means being supported together on the bottom of said lower casing for removal therewith, and operating means for said valve, mounted on said column adjacent to said spout, connected through the bottom of said chamber with said valve.

13. In a water column, a valve chamber having a dashpot casing at one side and having a settling chamber through which the dash-pot casing communicates with the interior of the valve chamber, and having an upright passage between said dash-pot casing and the main body of the valve chamber, a plunger in said casing, a valve in said chamber, a connection extending from said valve through the bottom of said chamber, a connection to said plunger, extending through said passage, a spout communicating downwardly with said chamber, means extending from said valve connection and said plunger connection, under said chamber to one side thereof, and valve operating means, mounted on said column adjacent to said spout, connected to the aforesaid means.

14. In a water column, a valve chamber, a valve in said chamber, a spout above said chamber, a conduit from said chamber up to said spout, having a lateral drain passage near the top of said chamber, said conduit having an upwardly facing lateral surface over said passage, a valve plug fitting in the adjacent part of the conduit through said surface and across said drain passage, having an opening to register with said passage as the plug is turned and having a projection above said surface, and a spout having an ear held between said plug projection and said surface, whereby said spout is held in operative position near the outer end of said drain passage.

15. A water column comprising a valve and having a lateral drain passage above said valve, an apertured plug turned to close or open said passage and having a projection outside said passage, and a spout having a projection engaged by the plug projection, whereby said spout is held in operative position near the discharge end of said drain passage.

16. In a water column, a valve chamber, a valve in said chamber, a spout above said chamber, a conduit from said chamber up to said spout, comprising a lower structure fixed to said chamber, and an upper structure movable relatively to said lower structure and said chamber and having a hollow hub intermediate of its lower and upper ends, spaced projections on a side of said hub, a cam member having a projection between said spaced projections and engaging upwardly against said projections to support said upper structure, a pedestal, a roller on said pedestal supporting said cam, and valve-operating means adjacent to said spout, connected to said valve.

17. In a water column, a valve chamber, a valve in said chamber, a beam under said chamber, connected to said valve through the bottom of the chamber and extending to opposite sides of the chamber, a spout above said chamber, a conduit leading from said chamber up to said spout, a lever fulcrumed on said conduit near said spout, a yoke connected to said lever and extending to opposite sides of said conduit, and rods connected to said yoke and extending down along the respective sides of said conduit and connected to said beam at respective sides of said valve chamber.

18. In a water column, a valve chamber, a valve in said chamber, a beam under said chamber, connected to said valve through the bottom of the chamber and extending to opposite sides of the chamber, a spout above said chamber, a conduit comprising a lower part fixed to said chamber and an upper part leading from said lower part up to said spout and rotatable on an upright axis relatively to said lower part and said chamber, valve-operating means mounted on said upper part of said conduit near said spout, rods connected to said valve-operating means and extending down along opposite sides of said conduit, vertically spaced rings around said conduit, connected to said rods, an annular yoke around said conduit between said rings, having laterally extending arms, and rods connected to the respective arms and extending down along respective sides of said valve chamber and connected to said beam.

19. In a water column, a valve chamber, a valve in said chamber, a beam under said chamber, connected to said valve through the bottom of the chamber and extending to opposite sides of the chamber, a spout communicating downwardly with said chamber and movable sidewise relatively to said chamber, valve-operating means movable with said spout, rods extending upward from said beam at the respective sides of said chamber, bearings for said rods in the sides of the chamber, and a swivel connection from said rods to said valve-operating means.

20. In a water column, a valve chamber, a dash pot at one side of said chamber, comprising a plunger movable up and down, a valve movable up and down in said chamber, a beam under said chamber, connected to said valve through the bottom of the chamber, extending under said chamber to opposite sides thereof and having an extension under said chamber toward said dash pot, a connection from said extension to said plunger, a spout communicating downwardly with said chamber and movable sidewise relatively to said chamber, valve-operating means movable with said spout, rods extending upward from said beam at the respective sides of the chamber, bearings for said rods in the sides of the chamber, and a swivel connection from said rods to said valve-operating means.

21. In a water column, an upright conduit, a valve near the bottom of said conduit, a spout movable relatively to said conduit near the top thereof, valve-operating means on said conduit near said spout, rods extending from said valve-operating means down along opposite sides of said conduit and connected to said valve, cables connected to said spout and extending down along the respective rods, and an annular counterweight for said spout, surrounding said conduit and said rods and connected to the lower ends of said cables and having its periphery eccentric to its interior opening.

22. In a water column, in combination with an upright conduit, a valve at the bottom of said conduit and a T head at the top of said conduit, having a goose-neck, a spout communicating with said goose-neck, a track element supported on said conduit over said spout, a roller traveling on said element, an adjustable connection between said roller and said spout, and means supported on said T head for supporting said spout to travel with said roller along said track element.

23. In a water column, a valve chamber, a valve in said chamber, a spout above said chamber, communicating downwardly therewith, a valve-operating lever near said spout, a yoke under said lever, rods extending down from said yoke and connected to said valve, and an eye-bolt having a shank extending down and threaded in said yoke, said eye bolt engaging around said lever, and by its threaded connection with said yoke being adapted to vary the effective length of the connection from the lever to the valve.

24. In a water column, a valve chamber, a conduit leading up from said chamber, a spout leading from the upper end of said conduit, valve-operating means near said spout, and connecting means from said valve-operating means to said valve comprising rods at opposite sides of said conduit, connected to said valve up through the bottom of said chamber, said rods being adapted to impose their weight on said valve, to seat the valve, and, by virtue of their upwardly extended connection to the valve, minimizing the tendency to tilt said valve on its seat.

FRANK C. ANDERSON.